Jan. 2, 1962   G. N. PLOTKIN   3,015,820
RADIATION LOAD SIMULATOR FOR PROXIMITY FUZE
Filed Aug. 4, 1958                                2 Sheets-Sheet 1

INVENTOR
GERALD N. PLOTKIN
BY
ATTORNEYS

Jan. 2, 1962 G. N. PLOTKIN 3,015,820
RADIATION LOAD SIMULATOR FOR PROXIMITY FUZE
Filed Aug. 4, 1958 2 Sheets-Sheet 2

INVENTOR
GERALD N. PLOTKIN
BY
ATTORNEYS.

3,015,820
RADIATION LOAD SIMULATOR FOR PROXIMITY FUZE

Gerald N. Plotkin, Silver Spring, Md., assignor to the United States of America as represented by the Secretary of the Navy
Filed Aug. 4, 1958, Ser. No. 752,707
7 Claims. (Cl. 343—17.7)
(Granted under Title 35, U.S. Code (1952) sec. 266)

The invention described herein may be manufactured and used by or for the Government of the United States of America for governmental purposes without the payment of any royalties thereon or therefor.

This invention relates generally to simulation and test apparatus, and more particularly to a coaxial line type instrument for testing and measuring certain electrical operating characteristics of a radio proximity fuze under simulated free-space radiation loading conditions.

Although there is disclosed in the prior copending application of Donald D. King, Serial No. 615,732, filed October 12, 1956, of common assignee with this application, coaxial line type apparatus for simulating the free space antenna loading on a projectile mounted proximity fuze and the cyclical variation in the loading caused by energy reflections from a suitable target, this prior art apparatus, although performing satisfactorily has been found to have certain inherent undesirable characteristics which are a source of error and seriously limit the useability thereof. One major difficulty of the hereinabove referred to apparatus lies in its inability to simulate the free space loading of a projectile on its associated proximity fuze over the entire frequency band of broad band type proximity fuzes. Another major limitation of the prior art coaxial line simulator is its inability to effect a level of modulation of the fuze representative of target proximity over a broad operating frequency band. In addition, the magnitude of modulation of the previously devised simulating apparatus was found to be lacking in constancy. Intensive and prolonged analytical studies and empirical efforts indicate that these disadvantages are caused by the multiple quarter wavelength physical length of the prior art simulator, narrow frequency resonance characteristic of the modulating loop, component, particularly crystal, aging, as well as spurious variations in the low-frequency signal source.

The difficulties inherent in the hereinbefore described prior art simulators are substantially overcome in the present invention by reducing the physical length of the coaxial line to approximately a quarter wavelength of the proximity fuze operating frequency for reproducing the free-space loading of the fuze and by the employment of a broad-band self-energized modulator for effecting the cyclical variation in the antenna impedance of the proximity fuze under test.

Accordingly, it is a principal object of the present invention to provide a new and improved broad band radiation load simulating apparatus for transceiver circuitry.

It is also an object of this invention to provide an improved secondary standard for testing or evaluating the operation of single and multiple channel radio proximity fuzes.

Another object of the present invention is to provide an improved instrumentality for accurately simulating the free space loading of a vehicular mounted proximity fuze over a broad frequency band.

Still another object of the instant invention is the provision of laboratory apparatus for artificially reproducing and measuring the variations in the antenna impedance of a radio proximity fuze.

A further object of this invention is to provide a system for conducting studies on complex impedance-frequency characteristics of electromagnetic wave radiating systems.

A still further object of the present invention is to provide a new and improved coaxial line section apparatus for measuring the electrical operating characteristics of the oscillator detector stage or stages of a transceiver.

Another still further feature of this invention resides in the provision of new and improved modulating means for a transmission line section electromagnetic field chamber.

Still another further object of the instant invention is the provision of improved apparatus and instrumentalities embodying novel features and principles, adapted for use in realizing the above objects and also adapted for use in other fields.

Other objects and many of the attendant advantages of the present invention will be more readily appreciated as the same becomes better understood by reference to the following detailed description when considered in connection with the accompanying drawings wherein.

Figure 1:
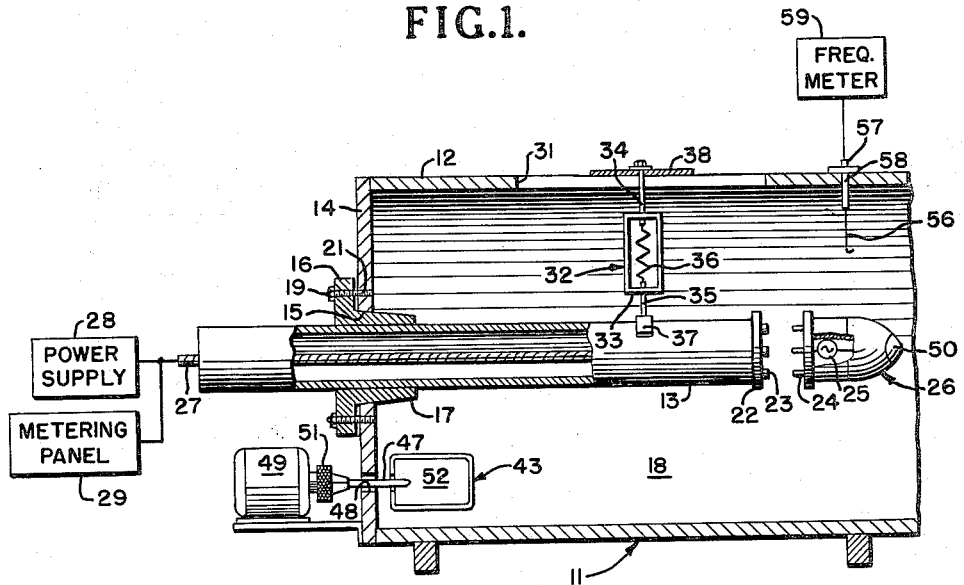
FIG. 1 is a schematic longitudinal cross sectional view of the entire simulating and measuring system according to the present invention.

Referring now to the accompanying drawings wherein identical reference numerals designate like or similar parts throughout the several views, and more particularly to FIG. 1 thereon the radiation load simulator according to the present invention is generally designated by the reference numeral 11. The simulator comprises a shorted section of a coaxial transmission line having an outer tubular shaped conductive member 12, an inner tubular shaped conductive member 13 centrally positioned therewithin, and a cover plate 14 secured, as by soldering to the outer member 12. The inner tubular member 13 slideably extends through a circular tapered aperture 15 centrally provided in cover plate 14. A collar 16 composed of conductive material and having a multiplicity of wedge shaped finger elements 17 integrally formed thereon conformingly encircles the inner conductor member 13 to allow for ready adjustment of the length of the inner conductor within the chamber 18 formed by the outer conductor 12 and cover plate 14, as will be explained more fully hereinafter. Additionally, a uniform electrical connection is effected between the inner conductor 13 and the end plate 14. A plurality of bolts 19 disposed within conformingly threaded recesses 21 of end plate 14 are peripherally arranged on collar 16 for securing the center conductor at a desired position within chamber 18 by the wedging action of finger elements 17 thereon.

Affixed to the end portion of inner conductor 13, which is positioned within the chamber 18, is a receptacle 22 having female electrical contacts 23 thereon for engaging the male electrical contacts 24 leading to the oscillator-detector circuit 25 of a proximity fuze, generally designated by the reference numeral 26. A proximity fuze oscillator-detector circuit adapted to be tested by the instant invention is described in "Proximity Fuzes for Artillery" by H. Selvidge in Electronics, February 1946 issue, pages 104–109. Fuze receptacle 22 is connected through cable 27 disposed within the inner tubular member 13 to an externally located power supply 28 and a monitoring meter panel 29 for providing suitable operating potentials and operational indicators for the proximity fuze connected thereto.

The outer conductor 12 of the simulator 11 is provided with a longitudinal slot 31, wherein is movably positioned a probe assembly bridging the center and outer conductor members, and being generally designated by the reference numeral 32. The probe assembly comprises a rectangular frame member 33, composed of an insulating material, and secured between conductive shaft members 34 and 35. Mounted within the frame 33 are one or more shunt connected resistance elements 36 electrically interconnecting metallic shafts 34 and 35, the resultant resistance of the elements being of a predetermined magnitude, as will be more fully explained hereinafter. A plurality of resilient finger contacts 37 are secured to probe shaft 35 for effecting reliable electrical engagement with inner conductor member 13. Secured to probe shaft 34 is a metallic plate 38, preferably curved to conformingly rest on outer conductor member 12 thereby to effect a reliable electrical engagement therewith. As more clearly shown in FIG. 2, the plate 38 is provided with a pair of parallel narrow grooves 39 along the longitudinal dimension thereof within each of which are disposed a screw 41 adapted to be threaded into one of several tapped recesses 42 formed in the outer conductor member 12 along the length of probe slot 31, thereby to allow for selective positional adjustment of the probe assembly along the longitudinal dimension of the outer conductor member 12, as will be explained more fully hereinafter. In order to insure a uniform and negligible resistance per unit area, all metallic surfaces of the simulator 11 bordering on the chamber area 18, as well as the underside of plate 38 and the outer surface area of the conductive member 12 immediately surrounding the longitudinal slot 31 are silver-plated.

A parallel resonant network 43 consisting of a miniature type capacitor 44 (FIG. 3), a loop of wire 45, acting as the inductance of the network, and a shunting resistor 46 for selectively lowering the Q or sharpness of resonance response, of the network is mounted upon a shaft 47. The shaft 47 projects through an aperture 48 formed in cover plate 14. An electric motor 49 is mounted upon the cover plate 14 and is provided with a securing chuck mechanism 51 for effecting rotation of the resonant network 43 within the chamber 18 at a low audio rotational rate at a predetermined distance from the end plate 14, as will be explained more fully hereinafter. In order to prevent deformation of the resonant network 43 due to handling, or the rotational speed thereof, the resonant network is preferably mounted upon a card 52 composed of phenolic material having a low moisture absorbing characteristic. As more clearly shown in FIG. 3, the card 52 is provided with a peripheral groove 53 with which the wire loop is adapted to be disposed. The card is shown as being provided with a narrow extended slot 54 adapted to be frictionally engaged by a key 55 formed in shaft 47, although obviously other conventional securing arrangements may be utilized. A pair of transverse bores 56 are formed in shaft 47 within which the resistor 46 and the capacitor 44 of the resonant network are adapted to be disposed and electrically connected to the loop inductance wire 45.

In order to calibrate the radiation load simulator 11 to accurately duplicate the free space antenna loading on a proximity fuze, it is initially necessary to obtain electrical operational data of the proximity fuze under actual, or simulated, free space conditions. This data may be obtained by subjecting the proximity fuze to a test in the primary test standard for proximity fuzes, or pole test, as described in the prior copending application of Francis M. Walters III, Serial No. 616,916, filed September 17, 1945, of common assignee with this application. It has been found desirable to obtain electrical operational data of the oscillator-detector stages of a plurality of proximity fuzes for a particular projectile, some of which operate at the extremes of the frequency band for the particular projectile, but the majority of which operate in the center region of the particular frequency band. The operational data required is the free space load and fully loaded oscillator plate current and the r.m.s. value of the A.C. ripple signal, which is the audio beat frequency between the generated and reflected signals. The fuzes are sequentially plugged into the receptacle 22 of the simulator, and energizing potential applied thereto from power supply 28. Upon energization of the proximity fuze 26, an electromagnetic field is generated in the chamber 18. By empirical adjustment of the length of the center conductor 13 within the chamber 18, a position will be located where the input impedance of the shorted coaxial line simulator 11 duplicates the loading effect upon a proximity fuze by its accompanying projectile. At this position, reproduction of the fuze free space load and fully loaded plate current oscillator-detector operational data will be indicated on the monitoring panel 29. To insure simulation of the free-space projectile loading on the fuze over the entire fuze oscillator frequency band for a particular projectile, the physical length of insertion of the center conductor is substantially less than a quarter of the electrical wavelength of the operating frequency of the proximity fuze under test. Also, the Q of the resonant line section is lowered by empirical variation of the magnitude of resistor or resistors 36 and the positioning of the probe assembly 32 along center conductor 13 until the free-space projectile loading data for all the primary standard tested proximity fuzes is reproduced. In order to minimize distortion in the generated electromagnetic field due to spurious reflections from the open end of chamber 18, the outer conductor 12 is of a sufficient physical length to insure that the top hat 50 of the proximity fuze under test, be at a distance from the chamber open end at least equivalent to the inside diameter of the outer tubular conductor member 12.

In order to accurately simulate the cyclical loading, or impedance, variations on a proximity fuze oscillator-detector due to the presence of an approaching or receding electromagnetic energy reflecting surface, such for example, as an airplane, the rotating resonant network 43, which is located proximate the shorted end region of the coaxial transmission line in which region the magnetic component of the electromagnetic field, or the current standing waves, are at a maximum, is utilized as a modulator. To effect a true representative degree of field modulation over the entire operating frequency range of a particular proximity fuze type, the resonant frequency, Q, as well as the position of the modulating network 43 is empirically varied until the ripple signal values of each fuze from the pole test are substantially reproduced, as indicated on the monitoring panel 29. In general, the resonant frequency of the modulating network 43 will be just below the lower end of the operating frequency band of the particular fuze type. By the aforedescribed empirical determination of the center conductor 13 length, the magnitude and positioning of probe resistors 36, the resonant frequency, Q, and positioning of the network 43 during an initial calibration procedure of the simulator 11, an accurate and reproducible artificial loading effect is achieved over the entire operating frequency band of a particular proximity fuze type.

A loop probe 56 connected to a coaxial connector 57 and extending through an aperture 58 in the outer conductor may be provided to allow for monitoring of the operating frequency of the proximity fuze under test by a suitable frequency meter 59 connected to the probe 56 through the coaxial connector 57.

Figure 2:
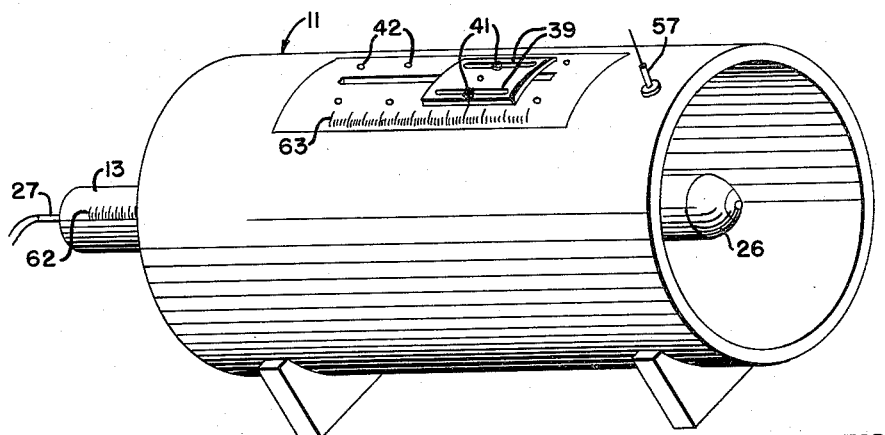
FIG. 2 is a perspective view, partially in section, of the coaxial transmission line simulator of the present invention.
Figure 3:
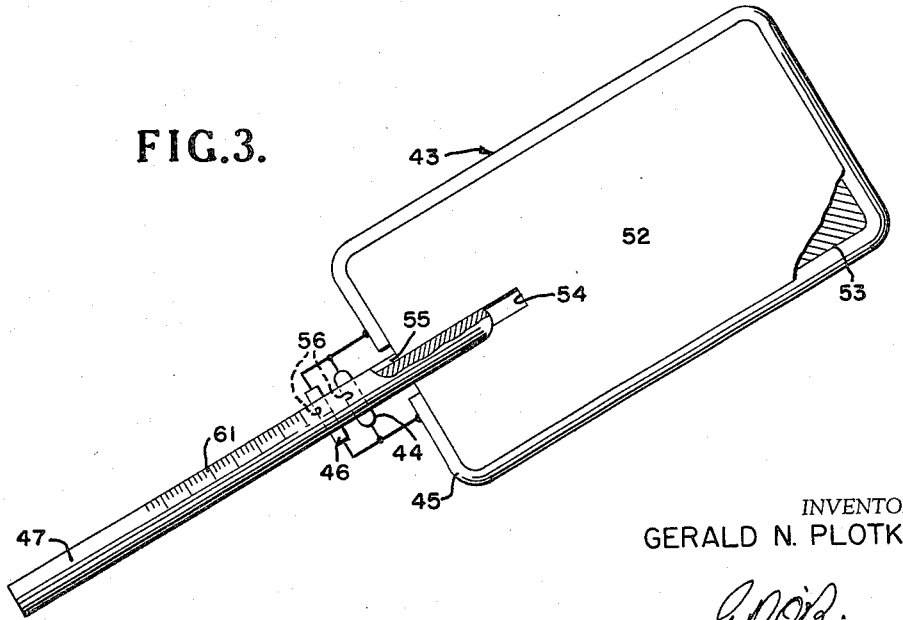
FIG. 3 is a perspective view of the novel electromagnetic field modulator for use in the simulator of FIG. 2.

Although it is preferable that a simulator be calibrated for only a single proximity fuze type, a simulator may be readily calibrated for all radio proximity fuze types by providing a separate modulating network 43 and probe resistors 36 for each fuze type, and furthermore, by providing calibration scales on the shaft 47, as more clearly shown in FIG. 3, and on the center conductor 13 and outer conductor 12, as more clearly shown in FIG. 2, each scale being respectively designated by the reference numerals 61, 62 and 63. If the initial calibration data for each proximity fuze type is recorded in terms of the scale readings, subsequent calibration of the radiation load simulator for testing a particular proximity fuze type is speedily accomplished by substitution of the corresponding modulating network and probe resistances, and positioning of the center conductor, the probe assembly and modulating network according to the recorded scale readings.

Figure 4:
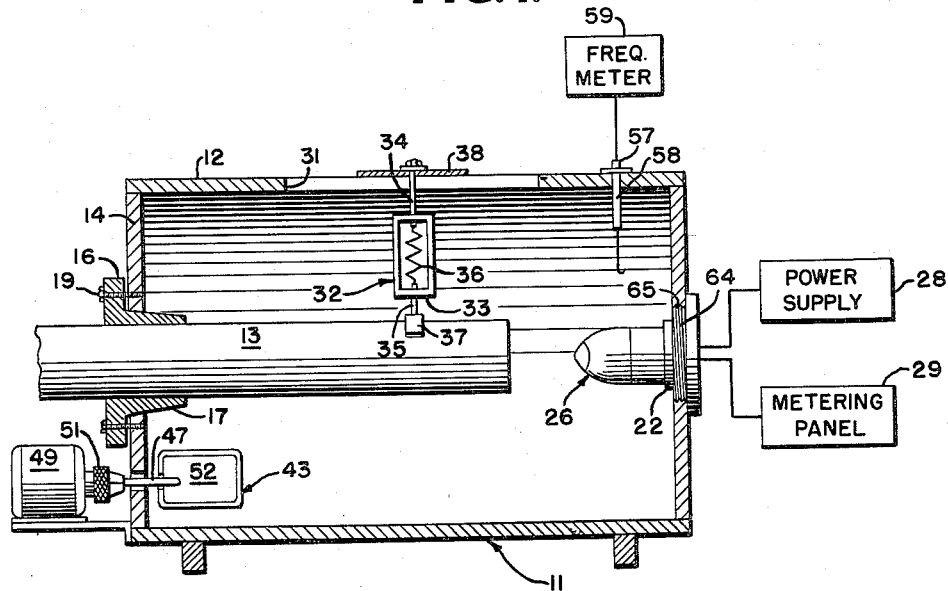
FIG. 4 is a schematic longitudinal cross sectional view of an alternative structural arrangement of a coaxial transmission line simulator according to the present invention.

FIG. 4 illustrates an alternative embodiment of a radiation load simulator 11 according to the instant invention. In this embodiment, the proximity fuze 26 under test is mounted in a receptacle 22 disposed on a plate member 64, either hingedly, or rotatably mounted, as shown, by cooperating threads 65 within the end plate 14 of the simulator. This embodiment employs the identical calibration procedure hereinbefore described for the calibration of the simulator embodiment of FIGS. 1 and 2.

Obviously many modifications and variations of the present invention are possible in the light of the above teachings. It is to be understood therefore that within the scope of the appended claims the invention may be practiced otherwise than as specifically described.

What is claimed as new and desired to be secured by Letters Patent of the United States is:

1. Apparatus for simulating the free space antenna loading on a proximity fuze comprising a closed end section of coaxial transmission line having an inner conductor and an outer conductor, means disposed within said coaxial line for receiving and energizing a proximity fuze connected thereto, impedance means bridging said inner and outer conductors for effecting the loading presented by said coaxial line to the connected proximity fuze, and rotating means disposed within said coaxial line for selectively varying the loading presented by said coaxial line to the connected proximity fuze.

2. Apparatus for simulating the free space antenna loading on a proximity fuze comprising a closed end section of coaxial transmission line having an outer conductor, an adjustable length center conductor, and a multiple apertured end plate, a receptacle affixed to one end of said inner conductor for receiving a proximity fuze under test, an energy source connected to said receptacle for energizing the received proximity fuze, mechanical means disposed within an aperture of said end plate and including a plurality of wedging members encircling said center conductor for securing a preselected length of said center conductor within said outer conductor, an impedance of a preselected magnitude bridging said center and outer conductors at a preselected position, a motor driven shaft extending a preselected distance through an aperture of said end plate into said coaxial line, and a low Q resonant network tuned to a preselected resonant frequency mounted on said shaft within said coaxial line.

3. Apparatus according to claim 2 wherein said receptacle is located within said coaxial line a distance from the open end thereof at least equivalent to the inside diameter of said outer conductor.

4. Apparatus according to claim 2 wherein the resonant frequency of said low Q resonant network is immediately below the lowest frequency of the operating frequency band of the proximity fuze under test.

5. Apparatus according to claim 2 and including a pick-up antenna inserted into said coaxial line through said outer conductor.

6. Apparatus for simulating the free space antenna loading on a proximity fuze comprising a closed end section of coaxial transmission line having an outer conductor, an adjustable length center conductor and a pair of annularly apertured end plates, an annular plate threadedly positioned within the aperture of one of said end plates, a receptacle mounted on said annular plate for receiving a proximity fuze under test, an energy source connected to said receptacle for energizing the received proximity fuze, mechanical means disposed within an aperture of the other of said end plates and including a plurality of wedging members encircling said center conductor for securing a preselected length of said center conductor within said outer conductor, an impedance of a preselected magnitude bridging said center and outer conductors at a preselected position, a motor driven shaft extending a preselected distance through an aperture in said other end plate into said coaxial line, and a low Q resonant network tuned to a preselected resonant frequency mounted on said shaft within said coaxial line.

7. Apparatus according to claim 6 wherein the resonant frequency of said low Q resonant network is immediately below the lowest frequency of the operating frequency band of the proximity fuze under test.

References Cited in the file of this patent

UNITED STATES PATENTS 2,727,140 Bell _____ Dec. 13, 1955